US012437600B2

(12) United States Patent
Horita et al.

(10) Patent No.: US 12,437,600 B2
(45) Date of Patent: Oct. 7, 2025

(54) MONEY HANDLING METHOD AND MONEY HANDLING SYSTEM

(71) Applicant: Glory Ltd., Himeji (JP)

(72) Inventors: Risa Horita, Himeji (JP); Hiroshi Danjo, Himeji (JP); Kenichi Tagashira, Himeji (JP)

(73) Assignee: GLORY LTD., Himeji (JP)

( * ) Notice: Subject to any disclaimer, the term of this patent is extended or adjusted under 35 U.S.C. 154(b) by 0 days.

(21) Appl. No.: 18/191,003

(22) Filed: Mar. 28, 2023

(65) Prior Publication Data

US 2023/0316845 A1 Oct. 5, 2023

(30) Foreign Application Priority Data

Mar. 29, 2022 (JP) ................................ 2022-053652

(51) Int. Cl.
*G07D 11/245* (2019.01)
*G07D 11/23* (2019.01)

(52) U.S. Cl.
CPC ........... *G07D 11/245* (2019.01); *G07D 11/23* (2019.01)

(58) Field of Classification Search
CPC ....... G07D 11/245; G07D 11/23; G07D 11/60
See application file for complete search history.

(56) References Cited

U.S. PATENT DOCUMENTS

| | | | | |
|---|---|---|---|---|
| 2020/0273280 | A1* | 8/2020 | Chen | G07D 11/34 |
| 2021/0056794 | A1* | 2/2021 | Nakamoto | G07D 11/60 |
| 2022/0012973 | A1* | 1/2022 | Shimakata | G07D 11/18 |
| 2022/0180687 | A1 | 6/2022 | Chen et al. | |

FOREIGN PATENT DOCUMENTS

| | | | | | |
|---|---|---|---|---|---|
| JP | H03-43884 | A | | 2/1991 | |
| JP | 2021033717 | A | * | 3/2021 | G07D 11/245 |
| JP | 2021-105895 | A | | 7/2021 | |

* cited by examiner

*Primary Examiner* — Sonji N Johnson
(74) *Attorney, Agent, or Firm* — XSENSUS LLP

(57) ABSTRACT

A money handling method includes: dispensing, by a money handling device, money stored in a storage unit in response to a request by a user, if a predetermined condition is satisfied; refilling, by a second device, the storage unit with money, if the money handling device is used by the user at the time of the start of refill by the second device; suspending the refill by the second device; and performing, by the second device, the suspended refill after the end of use of the money handling device by the user.

13 Claims, 10 Drawing Sheets

MONEY HANDLING METHOD AND MONEY HANDLING SYSTEM

CROSS-REFERENCE TO RELATED APPLICATION

This application claims priority to Japanese Patent Application No. 2022-053652 filed on Mar. 29, 2022, the entire disclosure of which is incorporated herein by reference.

BACKGROUND

A conventional coin handling device includes a coin depositing and dispensing machine and an extension unit. The coin handling device performs processing of depositing coins and processing of dispensing coins according to a user's request. The extension unit is provided together with the coin depositing and dispensing machine. The extension unit stores coins for refilling the coin handling device. The extension unit automatically executes refill processing when the inventory amount of the coin depositing and dispensing machine falls below a predetermined amount. The extension unit also executes the refill processing at a predetermined time, or automatically executes the refill processing at predetermined time intervals.

SUMMARY

A money handling method disclosed herein includes: dispensing, by a money handling device, money stored in a storage unit in response to a request by a user; refilling, by a second device, the storage unit with money if a predetermined condition is satisfied; suspending the refill by the second device if the money handling device is being used by the user at a time of a start of the refill by the second device; and performing, by the second device, the suspended refill after an end of use of the money handling device by the user.

DETAILED DESCRIPTION

Figure 1:
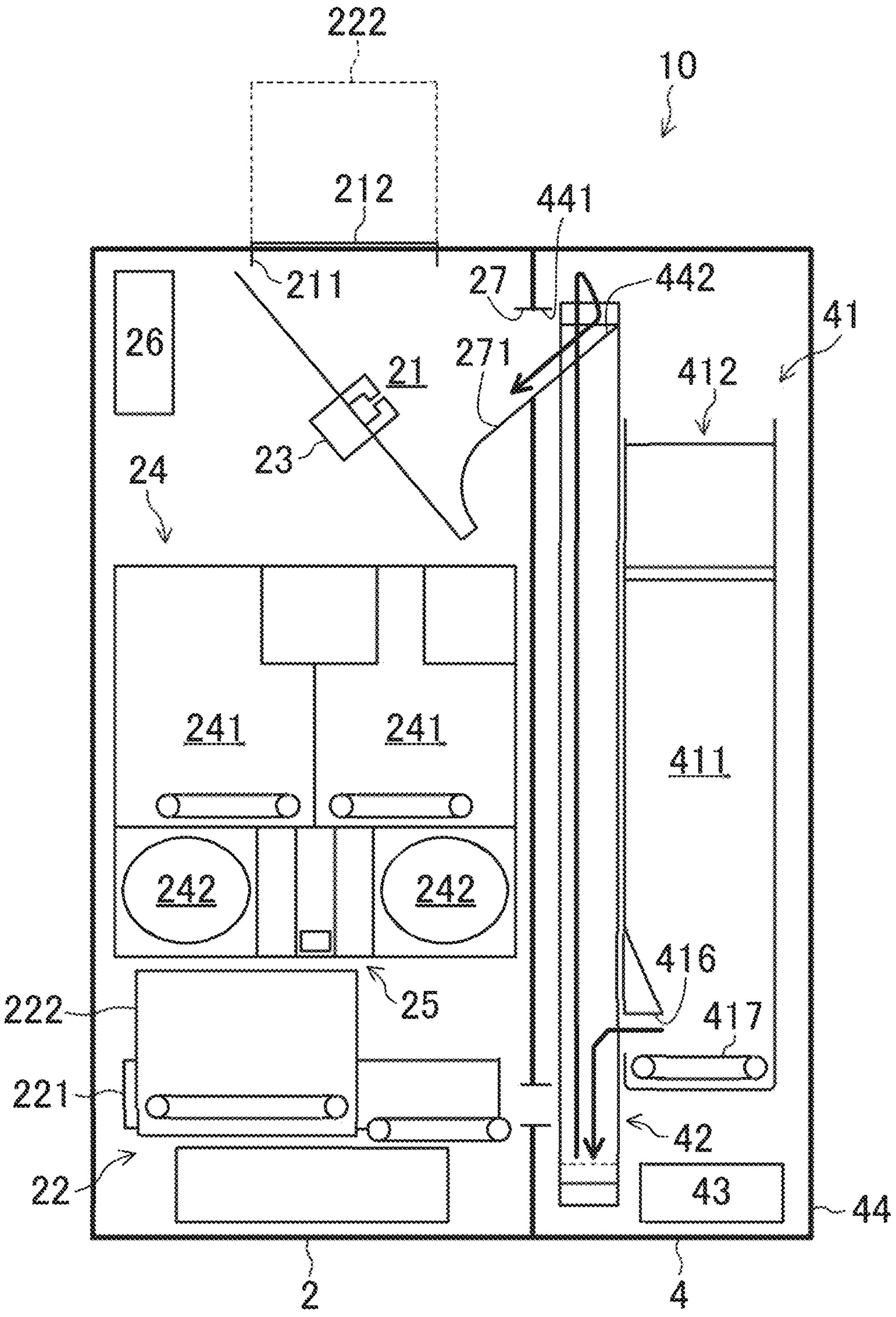
FIG. 1 illustrates a money handling system.

Unfortunately, the conventional coin handling device does not consider the case where the extension unit automatically executes the refill processing while the user is using the coin depositing and dispensing machine. In this case, in the conventional coin handling device, processing overlap occurs.

A money handling method disclosed herein includes: dispensing, by a money handling device, money stored in a storage unit in response to a request by a user; refilling, by a second device, the storage unit with money if a predetermined condition is satisfied; suspending the refill by the second device if the money handling device is being used by the user at a time of a start of the refill by the second device; and performing, by the second device, the suspended refill after an end of use of the money handling device by the user.

Here, the expression "if the money handling device is being used by the user" includes a state in which the money handling device is executing processing according to the request by the user. In addition, the expression "if the money handling device is being used by the user" also includes a state in which the user performs identification operation and the money handling device is occupied. The expression "after the end of use of the money handling device by the user" may mean after the end of the processing executed by the money handling device, or may mean after the end of occupation of the money handling device due to the end of one or more type of processing requested by the user.

According to the above-described money handling method, when the second device is about to refill the storage unit of the money handling device with money while the user is using the money handling device, the second device suspends the refill. The second device performs the suspended refill after the end of use of the money handling device by the user. Thus, the multiple types of processing do not overlap each other.

The predetermined condition may be arrival of a scheduled refill time.

When the second device is about to automatically start the refill for the storage unit at the scheduled refill time, the money handling device might be being used by the user. Since the second device suspends the refill, the multiple types of processing do not overlap each other. Since the second device performs the suspended refill after the end of use of the money handling device by the user, shortage of money in the money handling device is reduced.

During suspension of the refill, the money handling device may notify the user of suspension of the refill.

If the user who has received the notification gives priority to the refill, the user may perform an operation of interrupting the processing being executed, for example.

If the money handling device has received an interruption request for interrupting the use by the user by user operation during suspension of the refill, the second device may perform the suspended refill, and the interrupted use of the money handling device may be resumed after completion of the refill.

If the user requests interruption, the refill by the second device is preferentially executed. Since the interrupted processing is resumed after completion of the refill, the multiple types of processing are executed without overlapping each other.

Execution and non-execution of the suspended refill may be switched after the end of the use of the money handling device according to processing executed by the money handling device during suspension of the refill.

The second device can omit execution of the suspended refill.

The second device may execute the refill if a suspension time is within a predetermined time, and does not execute the refill if the suspension time exceeds the predetermined time.

The second device may perform the refill, for example, in a time period in which the frequency of use of the money handling device is low (for example, before a store opens or during a lunch break). With this configuration, it is possible to reduce overlap of the processing by the money handling device and the refill processing by the second device in advance.

If the use of the money handling device has ended quickly, a suspension time is relatively short. In this case, the time after the end of use of the money handling device often remains in the time period in which the frequency of use is low. The second device can execute the refill. If use of the money handling device is prolonged, the suspension time is relatively long. In this case, the time after the end of use of the money handling device might deviate from the time period in which the frequency of use is low. When the second device performs the refill, there is a probability that use of the money handling device by the user might be limited. If the suspension time exceeds the predetermined time, the second device preferably does not perform the refill.

The second device may execute the refill if the money handling device executes dispensing processing or collection processing during suspension of the refill, and may not execute the refill if the money handling device executes depositing processing during suspension of the refill.

If the money handling device executes the dispensing processing or the collection processing, the inventory amount in the storage unit decreases. Since the second device performs the refill after the end of use of the money handling device, shortage of money in the money handling device can be reduced. On the other hand, if the money handling device executes the depositing processing, the inventory amount in the storage unit increases. Even if the second device does not execute the refill, shortage of money in the money handling device can be avoided.

In the case where the money handling device has executed the depositing processing during suspension of the refill, the second device may execute the refill if the inventory amount in the storage unit after the depositing processing is less than a predetermined amount, and may not execute the refill if the inventory amount in the storage unit is the predetermined amount or more.

Even in the case where the money handling device executes the depositing processing, if the inventory amount in the storage unit after the end of use of the money handling device is small, the money handling device may run out of money. The second device executes the refill so that shortage of money in the money handling device can be avoided. On the other hand, the refill is not executed if the inventory amount in the storage unit is enough after the money handling device executes the depositing processing. Unnecessary refill can be omitted.

Execution and non-execution of the suspended refill may be switched according to the inventory amount in the storage unit after the end of use of the money handling device.

The second device may execute the refill if the inventory amount in the storage unit after the end of use of the money handling device is less than a predetermined amount, and may not execute the refill if the inventory amount in the storage unit is the predetermined amount or more.

With this configuration, shortage of money in the money handling device can be reduced, and unnecessary refill can be omitted.

The second device may execute the refill if the inventory amount in the storage unit after the end of use of the money handling device is an inventory amount before use or less, and may not execute the refill if the inventory amount in the storage unit after the end of use exceeds the inventory amount before use.

If the inventory amount in the storage unit does not increase as a result of one or more types of processing being executed by the money handling device, the second device executes the refill. Since the inventory amount in the storage unit increases due to the refill, it is possible to reduce shortage of money in the money handling device. On the other hand, if the inventory amount in the storage unit increases as a result of one or more types of processing being executed by the money handling device, the refill is not executed. Even if the refill is not executed, shortage of money in the money handling device can be reduced. Unnecessary refill by the second device can be omitted.

If the refill is not executed, the money handling device may notify the user of non-execution of the refill.

The user who has received the notification can recognize that there is a probability that the money handling device will run out of money.

If the refill is not executed, the money handling device may notify the user for prompting to perform the refill based on the inventory amount in the storage unit.

The user who has received the notification causes the money handling device to execute the refill processing, for example, by manual operation, so that shortage of money in the money handling device can be reduced.

The second device may refill the storage unit with money if the inventory amount in the storage unit is less than the predetermined amount in a case where the refill is not executed.

The second device may automatically perform the refill if the inventory amount in the storage unit has decreased to less than the predetermined amount.

A money handling system disclosed herein includes a money handling device that dispenses money stored in a storage unit in response to a request by a user, and a second device that is connected to the money handling device and refills the storage unit with money if a predetermined condition is satisfied. If the money handling device is being used by the user at the time of the start of refill, the second device suspends the refill, and performs the suspended refill after the end of use of the money handling device by the user.

Hereinafter, an embodiment of a money handling method and a money handling system will be described with reference to the drawings. The money handling method and the money handling system described herein are exemplary.

Figure 10:
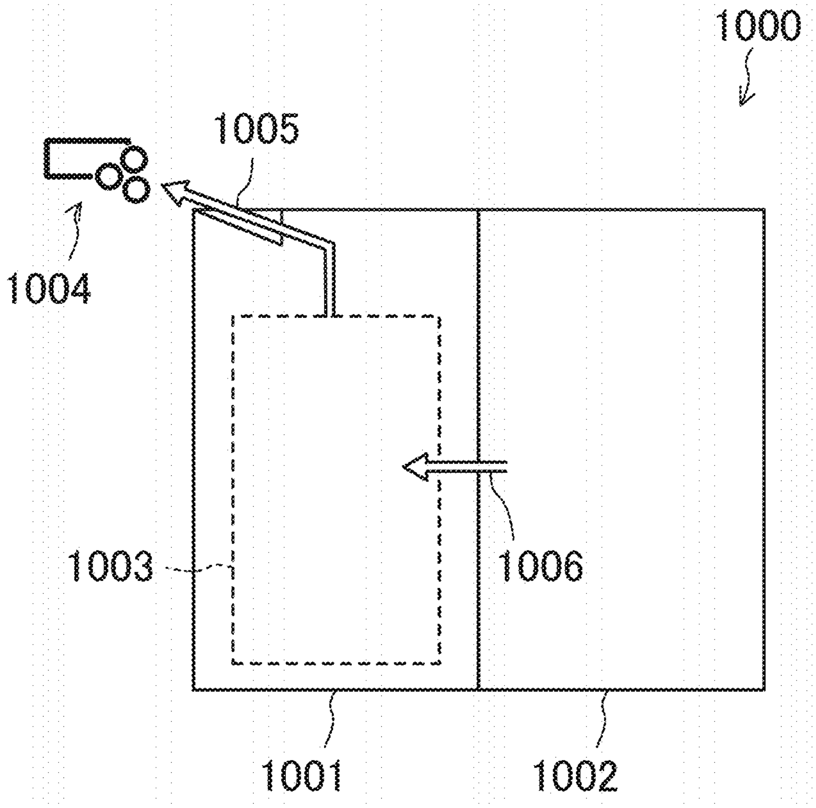
FIG. 10 illustrates a money handling system.

FIG. 10 illustrates, as an example, a money handling system 1000. The money handling system 1000 includes a money handling device 1001 and a second device 1002. The money handling device 1001 dispenses money 1004 stored in a storage unit 1003 in response to a request by a user (see an arrow 1005 in FIG. 10). Note that the form of dispensing may be various forms. For example, the money 1004 is dispensed to a collection unit, or is dispensed to a drawer or a cassette as a change fund. In dispensing, the money 1004 stored in the storage unit 1003 is discharged at least to the outside of a housing of the money handling device 1001.

The second device 1002 is connected to the money handling device 1001, and refills the storage unit 1003 with money when a predetermined condition is satisfied (see an arrow 1006).

The second device 1002 suspends the refill if the money handling device 1001 is used by a user at the time of the start of refill. The second device 1002 performs the suspended refill after the end of use of the money handling device 1001 by the user. Processing overlap upon the refill for the money handling device 1001 can be reduced.

Figure 2:
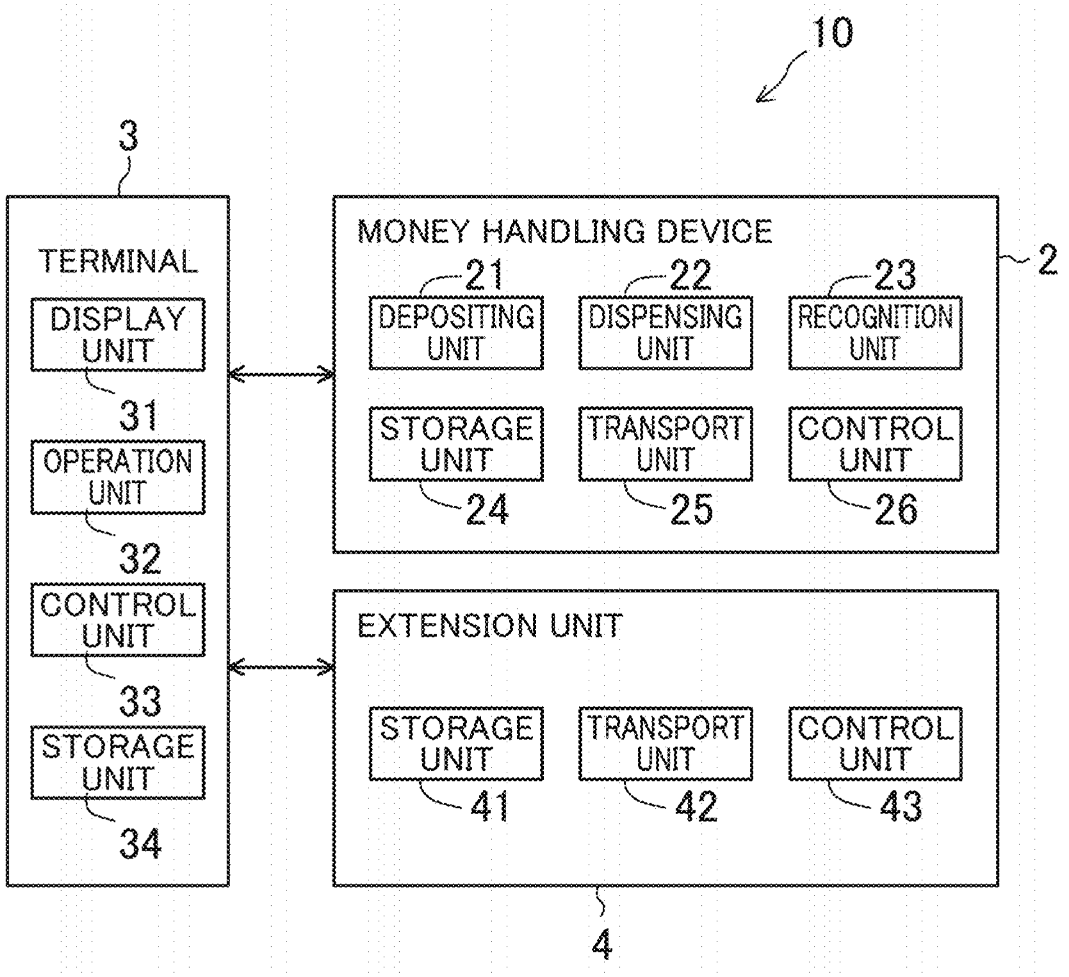
FIG. 2 illustrates a block diagram of the money handling system.

FIGS. 1 and 2 illustrate, as an example, a money handling system 10. The money handling system 10 is a variation of the money handling system 1000 of FIG. 10.

(Overall Configuration of Money Handling System)

The money handling system 10 is for managing cash received by a store clerk(s) from a customer(s) and cash given by a store clerk(s) to a customer(s) in a store. The money handling system 10 is installed in, for example, a back office of a store.

The money handling system 10 dispenses a change fund with which a money depositing and dispensing machine is charged. The money handling system 10 also receives sales collected from the money depositing and dispensing machine. The money depositing and dispensing machine is a device installed in a store, and is connected to a point of sales (POS). Note that the money depositing and dispensing machine receives money paid by a customer(s). The money depositing and dispensing machine dispenses change to be paid to a customer(s).

The illustrated money handling system 10 includes a coin handling device 2 which is a money handling device and an extension unit 4 which is a second device. The illustrated money handling system 10 further includes a terminal 3 as illustrated in FIG. 2. Note that the money handling system 10 may further include a banknote handling device which is a money handling device. The money handling system 10 may further include a printing unit. The printing unit may be a thermal transfer printer or an inkjet printer, for example.

(Configuration of Coin Handling Device)

The coin handling device 2 performs depositing processing of depositing loose coins and dispensing processing of dispensing loose coins. The coin handling device 2 has a transport unit 25 that is a transport member forms a transport path. The transport unit 25 transports coins inside the coin handling device 2.

The coin handling device 2 has a depositing unit 21. The depositing unit 21 receives coins to be deposited. The depositing unit 21 has an inlet 211. The inlet 211 is open in the upper surface of a housing of the coin handling device 2. The inlet 211 is provided with a shutter 212. The inlet 211 is normally closed by the shutter 212. The shutter 212 opens the inlet 211 in the depositing processing, for example.

An operator inserts coins to be deposited into the depositing unit 21 in the depositing processing. The depositing unit 21 is also attachable with a coin cassette 222. The coin cassette 222 stores coins collected from the money depositing and dispensing machine or coins with which the money depositing and dispensing machine is to be refilled. When the coin cassette 222 is attached to the depositing unit 21, coins are inserted from the coin cassette 222 into the depositing unit 21.

The depositing unit 21 has a feeding unit. The feeding unit feeds coins kept one by one.

The coin handling device 2 has a recognition unit 23 that is detector. The transport unit 25 transports coins from the depositing unit 21 to the recognition unit 23.

The recognition unit 23 recognizes coins. The recognition unit 23 recognizes at least the denominations of coins. The recognition unit 23 may recognize the authenticity and/or fitness of coins, for example.

The recognition unit 23 is a recognition circuit that includes at least one sensor. The recognition circuit comprises a timing sensor, an optical line sensor configured to apply a plurality of light rays such as infrared rays and visible rays to determine the optical properties of the banknotes and obtain optical image information of the banknotes, a thickness detection sensor configured to determine the thickness of the banknotes, and a magnetic sensor configured to determine the magnetic properties of the banknotes.

The coin handling device 2 has a storage unit 24. The storage unit 24 is arranged downstream of the recognition unit 23 in a coin transport path. The transport unit 25 transports coins from the recognition unit 23 to the storage unit 24. The storage unit 24 stores coins recognized by the recognition unit 23. The storage unit 24 is divided into a plurality of storage containers 241. The storage containers 241 store coins for respective denominations, for example. Coins inserted into the depositing unit 21 during the depositing processing are stored in the storage unit 24.

The storage unit 24 has feeding mechanisms 242 for the respective storage containers 241. The feeding mechanism 242 feeds coins stored in the storage region 241 during the dispensing processing, for example. The storage unit 24 can feed coins for the respective denominations.

The coin handling device 2 has a dispensing unit 22. The dispensing unit 22 is positioned below the storage unit 24. A drawer 221 is detachably attached to the dispensing unit 22. The drawer 221 may be attached to a POS register installed in a store, for example. The drawer 221 can store coins depending on the denominations. Coins fed out by the storage unit 24 for each denomination are inserted into the drawer 221 for the denomination as a change fund. For example, in the dispensing processing, the operator takes the drawer 221 with the inserted coins out of the dispensing unit 22.

A coin cassette 222 may further be attached to the dispensing unit 22. The coin cassette 222 is detachable from the dispensing unit 22. The transport unit 25 selectively transports coins fed out by the storage unit 24 to the drawer 221 or the coin cassette 222.

The coin handling device 2 has a control unit 26 that is a processing circuitry. The control unit 26 controls operation of the coin handling device 2.

(Configuration of Terminal)

The terminal 3 controls the entire money handling system 10. The terminal 3 has a display unit 31, an operation unit 32, a control unit 33 that is a processing circuitry, and a storage 34. The display unit 31 displays various types of information to the operator. The display unit 31 may be a flat panel display, for example. The operation unit 32 receives operation by the operator. A person in charge of a store operates the operation unit 32 when the depositing processing of depositing proceeds is executed and/or when the dispensing processing of dispensing a change fund is executed. The operation by the person in charge of the store also includes identification operation for checking whether or not the operator is valid. Further, a person in charge of a cash-in-transit (CIT) company operates the operation unit 32 when executing collection processing of collecting coins from the coin handling device 2. Note that the terminal 3 may have a touch panel. The touch panel includes the display unit 31 and the operation unit 32 that are integral with each other.

In addition to the control of the terminal 3, the control unit 33 outputs a control signal to the coin handling device 2 and the extension unit 4 described later. Further, the control unit 33 receives signals from the coin handling device 2 and the extension unit 4. The storage 34 stores various types of information. As will be described later, the schedule of execution of the refill processing is stored in the storage 34.

Note that the terminal 3 and the coin handling device 2 may be integral with each other. The function of the terminal 3 may be included in the coin handling device 2.

(Configuration of Extension Unit)

The coin handling device 2 may also include the extension unit 4. The extension unit 4 refills the coin handling device 2 with coins. As illustrated in FIG. 1, the extension unit 4 is installed next to and connected to the coin handling device 2. In this configuration example, the coin handling device 2 and the extension unit 4 form the money handling system 10. The extension unit 4 is one example of the second device. The extension unit 4 is added to the coin handling device 2. Hereinafter, the coin handling device 2 may be referred to as a main body for the extension unit 4.

As illustrated in FIG. 2, the extension unit 4 has a storage unit 41, a transport unit 42 that is a transport member forms a transport path, and a control unit 43 that is a processing circuitry. As illustrated in FIG. 1, the storage unit 41, the transport unit 42, and the control unit 43 are housed in a housing 44.

The storage unit 41 has one or more containers 411. The container 411 stores coins. The plurality of containers 411 may store coins for respective denominations, for example. When charging coins into the container 411, the operator directly inserts the coins into the container 411 through an insertion inlet 412 of the container 411.

The container 411 has a discharge outlet 416 at its bottom. In the configuration example of FIG. 1, the discharge outlet 416 is open horizontally on a side of the bottom of the container 411. The container 411 also includes a feeding unit 417 at its bottom. The feeding unit 417 is a belt wound between two rollers. With rotation of the rollers, the belt runs to transport coins. The coins transported by the belt are discharged to the outside of the container 411 through the discharge outlet 416. The control unit 43 adjusts the amount of discharged coins by adjusting the driving time of the feeding unit 417. Note that the control unit 43 may adjust the amount of discharged coins by adjusting the number or weight of coins having passed through the discharge outlet 416.

The transport unit 42 transports the coins, which have been discharged to the outside of the container 411, to an outlet 441 through the discharge outlet 416. The outlet 441 is provided in an upper portion of the housing 44. The outlet 441 is open horizontally in a side surface of the extension unit 4. As illustrated in FIG. 1, a chute 442 is attached to the outlet 441. The chute 442 guides the coins, which have been transported to an upper portion in the housing 44 by the transport unit 42, to the outside of the housing 44 through the outlet 441.

The outlet 441 of the extension unit 4 is connected to an inlet 27 of the coin handling device 2. The inlet 27 is open horizontally in a side surface of the coin handling device 2. The inlet 27 is attached with a chute 271 which is connected to the depositing unit 21. The coin handling device 2 and the extension unit 4 are connected to each other. The coins sent out through the outlet 441 of the extension unit 4 pass through the inlet 27 and enter the depositing unit 21. The inlet 27 is another opening through which coins can be inserted into the depositing unit 21. With the use of the inlet 27, coins can be inserted into the depositing unit 21 without opening the shutter 212 of the inlet 211.

Next, the refill of the coin handling device 2 with coins using the extension unit 4 will be described.

(Charging of Extension Unit with Coins)

First, the operator manually charges the extension unit 4 with coins. The operator is a person in charge of a CIT company, for example. The operator opens the extension unit 4, draws the container 411 out of the housing 44, and directly inserts coins into the container 411 through the insertion inlet 412.

After the coins have been inserted into the container 411, the operator pushes the drawn-out container 411 into the housing 44, thereby completing charging processing of charging the extension unit 4 with the coins. Note that the extension unit 4 does not include a recognition unit that recognizes and counts coins. The extension unit 4 cannot check the denomination and number of coins charged into the container 411. Information on the charged coins is separately provided from the CIT company to a store. Alternatively, a person in charge of the store may manually input the information on the charged coins to the terminal 3. Alternatively, a person in charge of the CIT company may manually input the information to the terminal 3.

(Coin Refill by Extension Unit)

For example, when a person in charge of a store operates the terminal 3, the refill processing of refilling the coin handling device 2 by the extension unit 4 can be executed. Specifically, the terminal 3 outputs a control signal, which corresponds to operation of the operation unit 32 by the operator, to the extension unit 4. The control signal includes information on the denomination of coins for refill and the amount of refill.

Upon receipt of the control signal, the extension unit 4 executes the refill processing for the coins. The control unit 43 of the extension unit 4 drives the feeding unit 417 of the container 411 storing coins of a designated denomination, thereby feeding the coins from the container 411. In addition, the control unit 43 drives the transport unit 42 to transport the coins fed from the container 411 to the outlet 441. The coins pass through the outlet 441, and enter the depositing unit 21 of the coin handling device 2 (see arrows in FIG. 1). Note that when the extension unit 4 executes the refill processing for the coins, the shutter 212 of the coin handling device 2 is locked, thereby preventing external coins from entering the coin handling device 2 through the inlet 211.

The depositing unit 21 of the coin handling device 2 feeds out the coins from the extension unit 4 one by one. The recognition unit 23 recognizes the coins. The transport unit 25 transports the recognized coins to the storage unit 24, and the storage unit 24 stores the coins in the storage containers 241 according to the denomination. The refill of the coin handling device 2 with the coins using the extension unit 4 is then completed.

(Automatic Refill in Money Handling System)

As described above, the operator can manually cause the money handling system 10 to start execution of the refill processing. In addition, the user can set a refill time for executing the refill processing in advance, and cause the money handling system 10 to automatically start execution of the refill processing. The storage 34 of the terminal 3 stores the schedule of execution of the refill processing. For example, the schedule may be set such that the refill processing is executed at a time before a store opens, a time after the store closes, and/or the time of a lunch break in the store, for example. It is advantageous to perform the refill processing in a time period in which a person in charge of the store does not execute the depositing processing and/or the dispensing processing in order to improve a work efficiency.

When the extension unit 4 automatically starts the refill processing in response to arrival of the refill time according to the schedule, there may be a case where the person in charge of the store causes the coin handling device 2 to execute the depositing processing and/or the dispensing processing or a case where a person in charge of a CIT company causes the coin handling device 2 to execute the collection processing. In this case, multiple types of processing may overlap each other in the money handling system 10. The money handling system 10 reduces such overlap of the multiple types of processing.

(First Control Mode)

Figure 3:
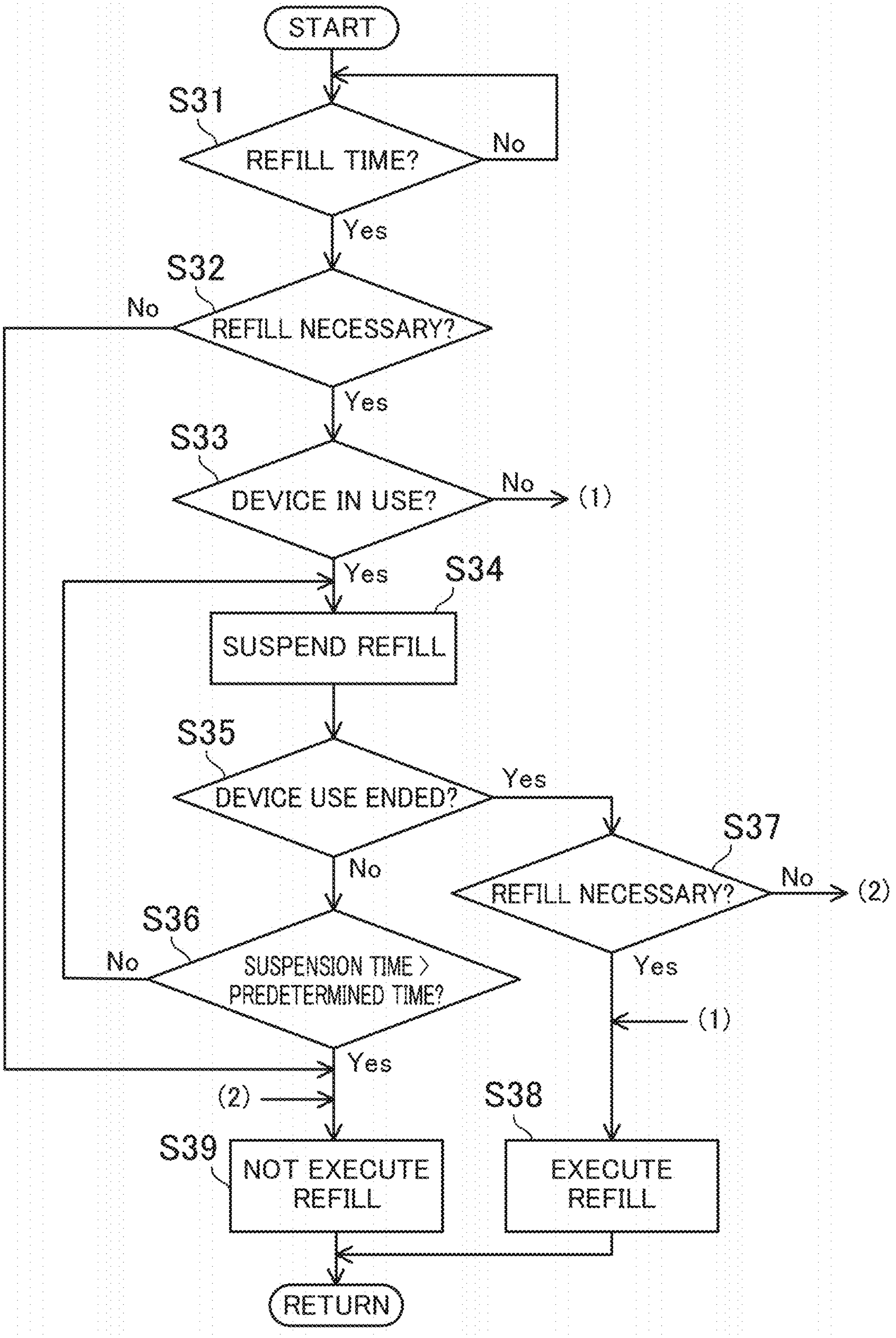
FIG. 3 illustrates steps of controlling the money handling system.

FIG. 3 illustrates, as an example, a flowchart according to a first control mode. This flowchart shows control steps executed by the control unit 33 of the terminal 3. In Step S31 after the start, the control unit 33 determines whether or not the time determined by the schedule, i.e., the refill time at which the refill processing is scheduled to be executed, has come. If the answer in Step S31 is No, Step S31 is repeated.

If the answer in Step S31 is Yes, the control unit 33 receives, in Step S32, information on the inventory amount in the coin handling device 2, i.e., information on the amount of coins stored in the storage unit 24, from the coin handling device 2. Then, based on the inventory amount, whether or not the refill processing needs to be executed is determined. The control unit 33 may determine that the refill processing needs to be executed when the inventory amount is less than a preset reference amount, and may determine that the refill processing does not need to be executed when the inventory amount is the reference amount or more. If the answer in Step S32 is No, the control unit 33 cancels, in Step S39, the refill processing at the scheduled refill time. That is, the extension unit 4 does not execute the refill processing. This is because the inventory amount in the coin handling device 2 is sufficiently high. Note that in Step S32, the control unit 33 may determine whether or not the refill processing needs to be executed according to the denomination.

On the other hand, if the answer in Step S32 is Yes, the control unit 33 determines, in Step S33, whether or not the coin handling device 2 is in use. The phrase "in use" includes a state in which the coin handling device 2 is executing processing such as the depositing processing or the dispensing processing. Moreover, the phrase "in use" includes not only the state in which the processing is being executed, but also a state in which, e.g., a person in charge of a store has finished the identification processing and the coin handling device 2 is occupied (a state in which the coin handling device 2 is not executing the processing). If the answer in Step S33 is No, i.e., if the coin handling device 2 is not in use, the control unit 33 causes, in Step S38, the extension unit 4 and the coin handling device 2 to execute the above-described refill processing. This is for avoiding the processing overlap.

Figure 4A:
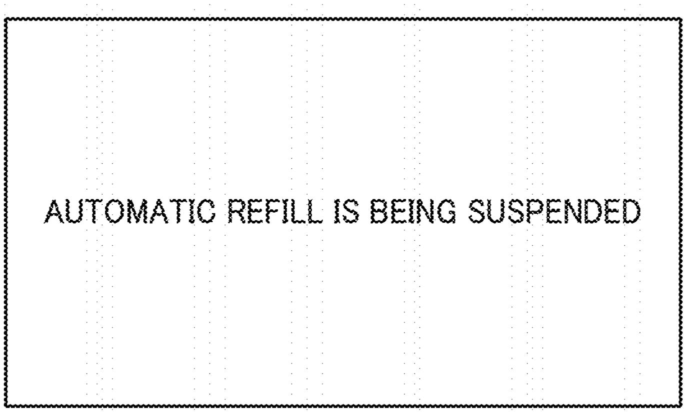
FIGS. 4A to 4C illustrate a screen for notification to a user.

On the other hand, if the answer in Step S33 is Yes, i.e., if the coin handling device 2 is in use, the control unit 33 suspends, in Step S34, the refill processing performed by the extension unit 4. As illustrated in FIG. 4A as an example, the display unit 31 of the terminal 3 may notify the operator, who is using the coin handling device 2, of suspension of the automatic refill by the extension unit 4.

In subsequent Step S35, the control unit 33 determines whether or not use of the coin handling device 2 has ended. Since the refill processing based on the schedule is suspended during the use of the coin handling device 2, the processing overlap is reduced.

When the coin handling device 2 ends execution of the processing such as the depositing processing or the dispensing processing, and/or when the operator, who has performed the identification, performs logout operation, the answer in Step S35 is Yes. Otherwise, the answer in Step S35 is No.

If the answer in Step S35 is No, the control unit 33 determines, in Step S36, whether or not a suspension time has exceeded a predetermined time. The suspension time is an elapsed time from the start of suspension of the refill processing in Step S34. If the suspension time does not exceed the predetermined time, suspension of the refill processing is continued in Step S34. Note that during suspension of the refill processing, the coin handling device 2 may execute not only one type of processing but also multiple types of processing.

If the suspension time has exceeded the predetermined time in Step S36, i.e., if the suspension time is long, the control unit 33 cancels the suspended refill processing in Step S39. The extension unit 4 does not execute the refill processing.

As described above, the time period in which the refill processing is executed corresponds to that before a store opens, after the store has been closed, or a lunch break, and is set to a time period in which the frequency of use of the coin handling device 2 is low. With this configuration, the money handling system 10 can reduce the processing overlap. If the above-described suspension time is relatively long, the time after the end of use of the coin handling device 2 may deviate from the time period in which the frequency of use is low. If the extension unit 4 executes the refill processing after the store has opened or after the end of the lunch break, there is a probability that use of the coin handling device 2 by a person in charge of the store or a person in charge of a CIT company is limited. For this reason, if the suspension time exceeds the predetermined time, the refill processing by the extension unit 4 may be cancelled.

Figure 4B:
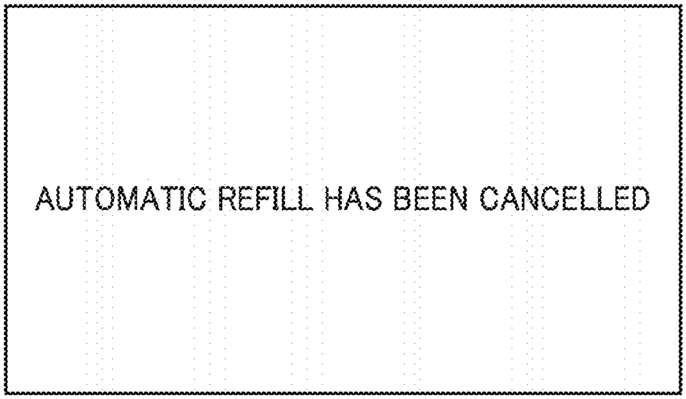

If the refill processing is not executed, the display unit 31 of the terminal 3 may notify, as illustrated in FIG. 4B as an example, the operator of the coin handling device 2, of cancellation of the automatic refill by the extension unit 4.

Figure 4C:
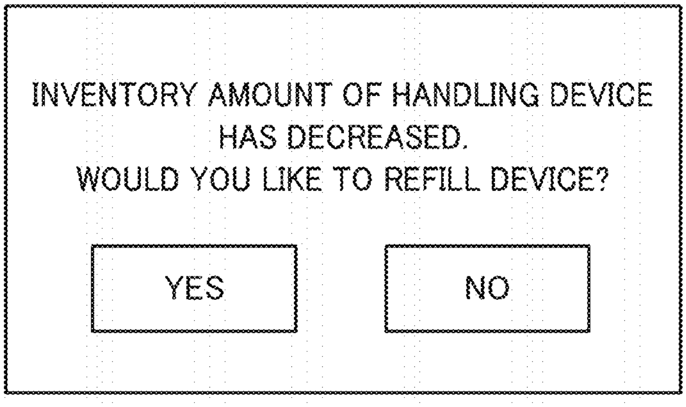

If the refill processing is not executed, the inventory amount in the coin handling device 2 may decrease until the next refill is performed. If the refill processing is not executed, the control unit 33 may sequentially check the inventory amount in the coin handling device 2, and if the inventory amount of the coin handling device 2 falls below a preset near-empty state, the control unit 33 may cause the display unit 31 of the terminal 3 to display a screen illustrated in FIG. 4C as an example. This screen is a screen for prompting the person in charge of the store to execute the refill processing. The person in charge of the store can manually start the refill processing according to the screen. If the inventory amount in the coin handling device 2 falls below the preset near-empty state, the control unit 33 may command the extension unit 4 to execute the refill processing. In this case, the money handling system 10 performs the refill for the coin handling device 2 even without a manual instruction.

On the other hand, if use of the coin handling device 2 has ended before the suspension time exceeds the predetermined time, the answer in Step S35 is Yes. If the suspension time is relatively short, the time after the end of use of the coin handling device 2 is often in the time period in which the frequency of use is low. The extension unit 4 can perform the refill. Thus, in Step S37, the control unit 33 determines, as in Step S32, whether or not the refill processing needs to be executed, based on the inventory amount in the coin handling device 2 after the end of use of the coin handling device 2. For example, when the coin handling device 2 performs the depositing processing while the refill processing is suspended, the inventory amount increases. As a result, there is a probability that execution of the refill processing is no longer necessary. If the answer in Step S37 is No, i.e., if the refill is not necessary, the control unit 33 cancels the refill processing in Step S39. The extension unit 4 does not execute the refill processing. If the answer in Step S37 is Yes, i.e., if the refill is necessary, the control unit 33 causes, in Step S38, the extension unit 4 to execute the refill processing. Note that the control unit 33 may make this determination according to the denomination.

Note that in Step S36, the control unit 33 may determine whether or not the coin handling device 2 performs the processing multiple times. If the processing is performed multiple times, the time after the end of use of the coin handling device 2 may deviate from the time period in which the frequency of use is low. In Step S39, the control unit 33 may cancel the refill processing. If the processing is not performed multiple times, i.e., if the coin handling device 2 has executed one type of processing and use of the coin handling device 2 has ended, the control unit 33 may cause the extension unit 4 to perform the refill processing in Step S38.

In Step S37, the control unit 33 may determine whether or not the inventory amount after the end of use of the coin handling device 2 is the inventory amount before use or less. That is, if the inventory amount after the end of use of the coin handling device 2 has reached the inventory amount before use or less, the extension unit 4 may execute the refill in Step S38. If the inventory amount after the end of use has exceeded the inventory amount before use, the refill may be cancelled in Step S39. This determination has an advantage that, when the coin handling device 2 executes the multiple types of processing, an increase or decrease in the inventory amount due to these multiple types of processing can be taken into consideration. Note that even when the inventory amount after the end of use exceeds the inventory amount before use, if the inventory amount is less than the reference value, the extension unit 4 may execute the refill in Step S38.

As described above, in the first control mode, when the extension unit 4 starts execution of the refill processing, if the coin handling device 2 is in use, the refill processing is suspended. With this configuration, the processing overlap in the money handling system 10 can be reduced. According to the length of the suspension time, execution and non-execution of the refill processing after the end of use of the coin handling device 2 are switched. The extension unit 4 can perform the refill with coins in the time period in which the frequency of use of the coin handling device 2 is low, and can avoid the refill with coins in the time period in which the frequency of use is high.

Note that in the first control mode, the extension unit 4 executes the refill processing according to the schedule (Step S31). Step S31 may be omitted. In this case, in Step S32 after the start, the control unit 33 determines whether or not the inventory amount in the coin handling device 2 has fallen below, for example, the near-empty state. If the answer is Yes, the extension unit 4 attempts to start the refill processing in Step S33. The extension unit 4 may automatically execute the refill processing based on the inventory amount in the coin handling device 2 instead of following the schedule.

Step S32 may be omitted without omitting Step S31. In this case, when the scheduled refill time comes in Step S31, the extension unit 4 attempts to start the refill processing in Step S33.

(Second Control Mode)

Figure 5:
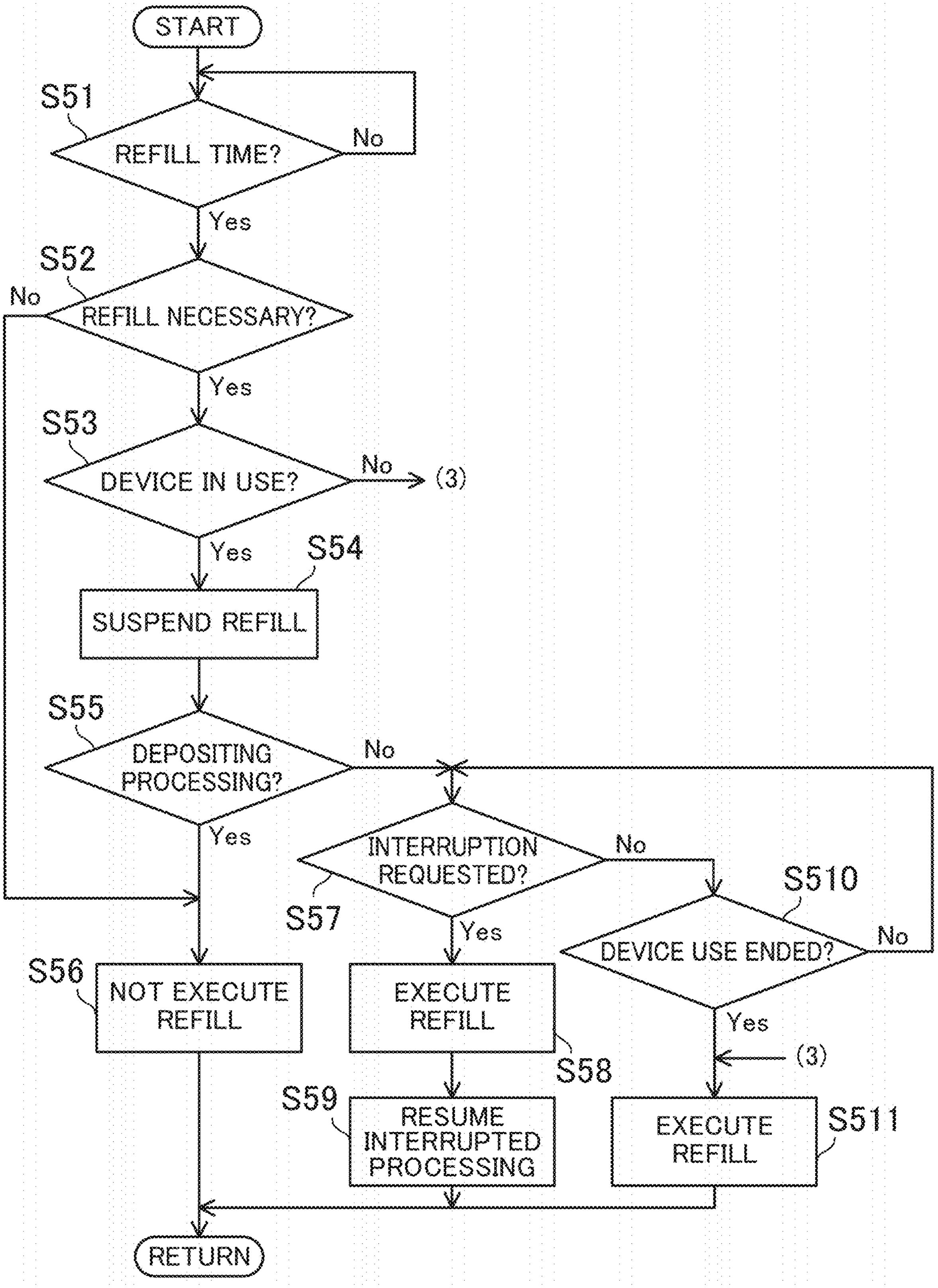
FIG. 5 illustrates steps of controlling the money handling system.

FIG. 5 illustrates, as an example, a flowchart according to a second control mode. This flowchart shows control steps executed by the control unit 33 of the terminal 3. In the second control mode, according to the type of processing executed by the coin handling device 2 while the refill processing is suspended, execution and non-execution of the refill processing after the end of use of the coin handling device 2 are switched.

First, in Step S51 after the start, the control unit 33 determines whether or not the scheduled refill time has come. If the answer in Step S51 is No, Step S51 is repeated. Note that Step S51 can be omitted as in the case described above.

If the answer in Step S51 is Yes, the control unit 33 determines, in Step S52, whether or not the refill processing needs to be executed, based on the inventory amount in the coin handling device 2. If the answer in Step S52 is No, the control unit 33 cancels the refill processing in Step S56. The extension unit 4 does not execute the refill processing. Note that Step S52 can be omitted as in the case described above.

On the other hand, if the answer in Step S52 is Yes, the control unit 33 determines, in Step S53, whether or not the coin handling device 2 is in use. If the answer in Step S53 is No, the control unit 33 causes, in Step S511, the extension unit 4 to execute the refill processing. If the answer in Step S53 is Yes, the control unit 33 causes, in Step S54, the extension unit 4 to suspend the refill processing.

In Step S55, the control unit 33 determines whether or not the processing to be executed, being executed, or having been executed by the coin handling device 2 is the depositing processing. When the depositing processing is executed, the inventory amount in the coin handling device 2 increases. Thus, the refill processing by the extension unit 4 is not necessary. If the answer in Step S55 is Yes, the control unit 33 cancels the refill processing in Step S56. The extension unit 4 does not execute the refill processing.

Note that in Step S55, the control unit 33 may determine that the refill processing is not necessary if the depositing processing is executed multiple times. This is because it can be predicted that the inventory amount of the coin handling device 2 is sufficiently high if the depositing processing is executed multiple times.

Figure 6:
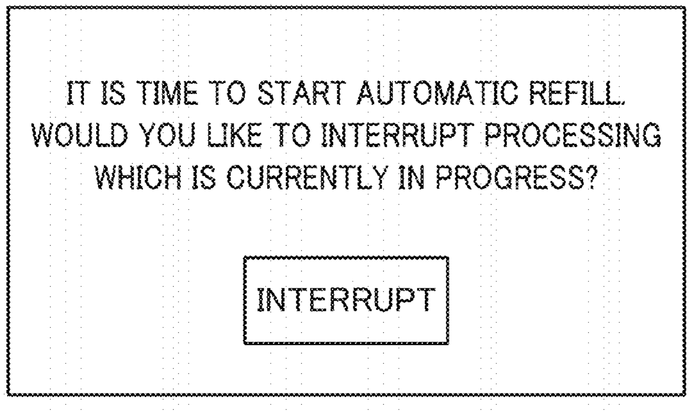
FIG. 6 illustrates a screen for notification to the user.

If the refill processing is suspended, the control unit 33 causes the display unit 31 of the terminal 3 to display, for example, a screen illustrated in FIG. 6. This screen is a screen for allowing the user to select whether or not the processing being executed or to be executed by the coin handling device 2 is to be interrupted.

If the answer in Step S55 is No, the control unit 33 determines, in Step S57, whether or not the user has performed interruption request operation. If the user has selected and operated an "interrupt" button in FIG. 6 and the control unit 33 has received an interruption request by user operation, the answer in Step S57 is Yes. If the answer in Step S57 is Yes, the control unit 33 causes, in Step S58, the coin handling device 2 to interrupt the processing being executed or to be executed. The processing in this case is the dispensing processing or the collection processing. The depositing unit 21 of the coin handling device 2 does not keep coins. The extension unit 4 can execute the refill processing through the depositing unit 21 while the processing of the coin handling device 2 is interrupted.

When the refill processing by the extension unit 4 in Step S58 ends, the control unit 33 causes, in subsequent Step S59, the coin handling device 2 to resume the interrupted processing, i.e., the dispensing processing or the collection processing.

On the other hand, if the user does not select and operate the "interrupt" button in Step S57, the answer in Step S57 is No.

If the answer in Step S57 is No, the control unit 33 determines, in Step S510, whether or not use of the coin handling device 2 has ended. If the answer in Step S510 is No, the control unit 33 determines, in Step S57, whether or not the user has performed the interruption request operation.

If the answer in Step S510 is Yes, the control unit 33 causes, in Step S511, the extension unit 4 to execute the suspended refill processing.

Note that the same determination step as Step S52 may be added between Step S55 and Step S56. That is, even when the coin handling device 2 executes the depositing processing during suspension of the refill, if the inventory amount in the coin handling device 2 after the depositing processing is less than a predetermined amount, the extension unit 4 may execute the refill. If the inventory amount in the coin handling device 2 is the predetermined amount or more, the extension unit 4 may not execute the refill. Thus, shortage of coins in the coin handling device 2 can be avoided. In addition, unnecessary refill can be omitted.

The same determination step as Step S52 may be added between Step S510 and Step S511.

In the determination step added between Step S55 and Step S56 or between Step S510 and Step S511, the control unit 33 may determine whether or not the inventory amount after the end of use of the coin handling device 2 is the inventory amount before use or less.

(Third Control Mode)

A third control mode is control of enabling the coin handling device 2 to perform the dispensing processing while the extension unit 4 is performing the refill processing. Since the depositing unit 21 is not used in the dispensing processing, the refill processing by the extension unit 4 and the dispensing processing by the coin handling device 2 can be executed in parallel.

Figure 7:
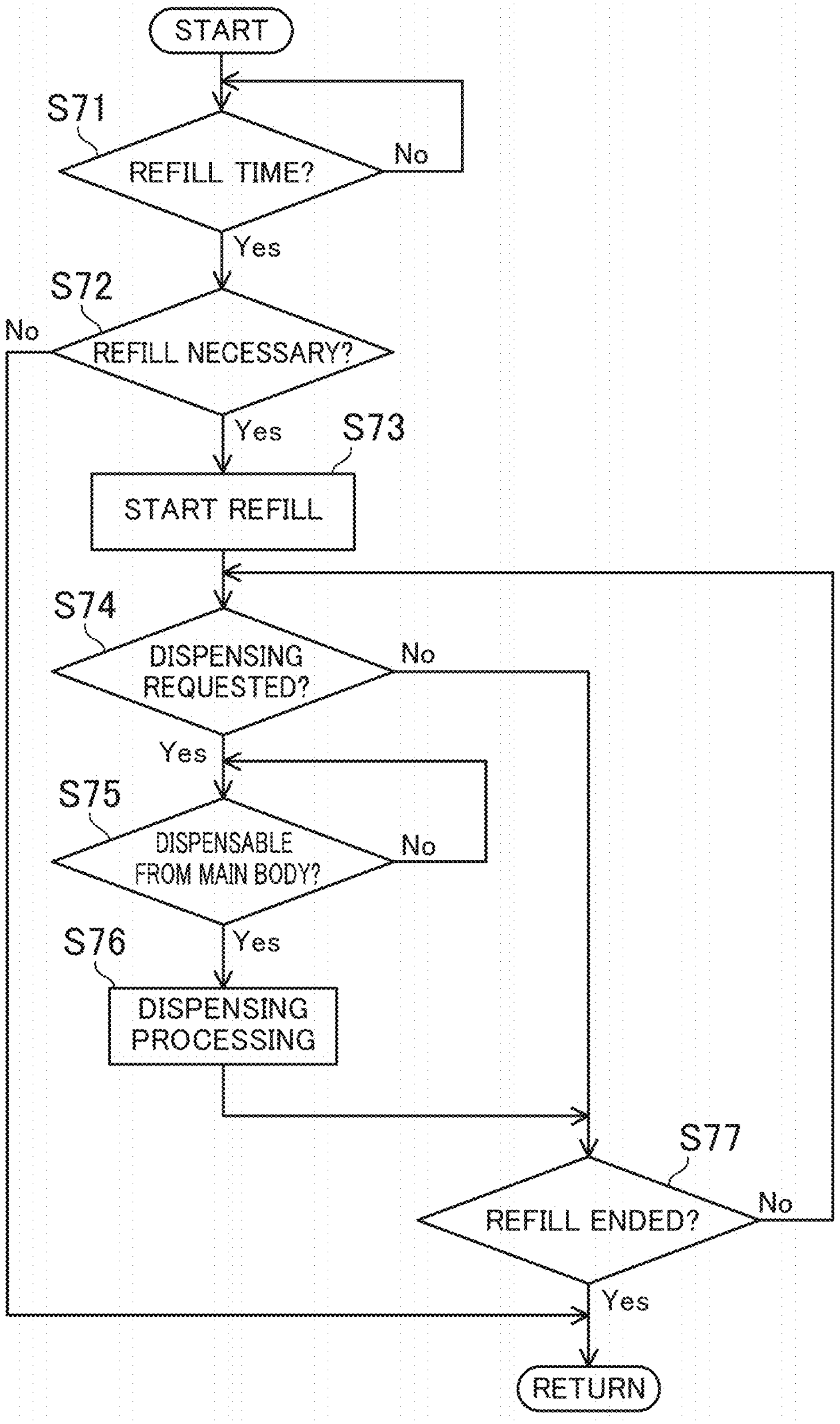
FIG. 7 illustrates steps of controlling the money handling system.

FIG. 7 is a flowchart according to the third control mode. This flowchart shows control steps executed by the control unit 33 of the terminal 3. In Step S71 after the start, the control unit 33 determines whether or not the scheduled refill time has come. If the answer in Step S71 is No, Step S71 is repeated. Step S71 can be omitted as in the case described above.

If the answer in Step S71 is Yes, the control unit 33 determines, in Step S72, whether or not the refill processing needs to be executed, based on the inventory amount in the coin handling device 2. Step S72 can be omitted as in the case described above. If the answer in Step S72 is No, the refill processing is not executed.

Figure 8:
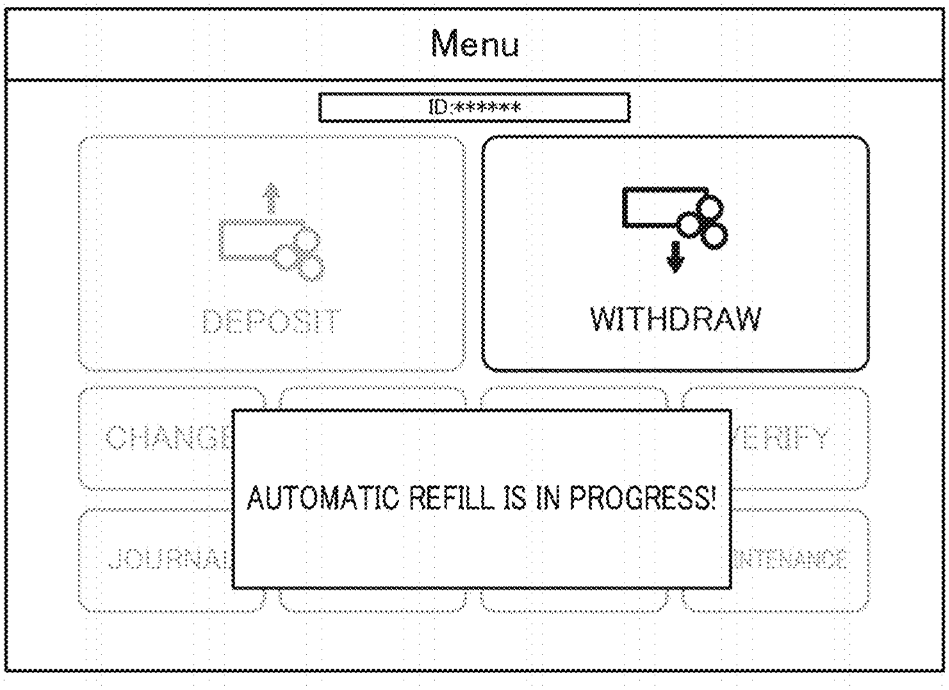
FIG. 8 illustrates a screen for notification to the user.

If the answer in Step S72 is Yes, the control unit 33 causes, in Step S73, the extension unit 4 to start the refill processing. When the refill processing is started, the control unit 33 may display a message indicating that the automatic refill is being executed, on a menu screen displayed on the display unit 31 of the terminal 3 as illustrated in FIG. 8 as an example. Further, among a plurality of operation buttons on the menu screen, only an operation button for the dispensing processing may be operable, and the other operation buttons may not be operable. In the example of FIG. 8, the operation buttons other than that for the dispensing processing cannot be operated by being grayed out. With this configuration, during execution of the refill processing by the extension unit 4, only the dispensing processing can be performed in the coin handling device 2.

Returning to the flow of FIG. 7, in Step S74 after the start of the refill processing, the control unit 33 determines whether or not the dispensing processing has been requested in the coin handling device 2.

If the dispensing processing has not been requested, i.e., the answer in Step S74 is No, the control unit 33 determines, in Step S77, whether or not the refill processing has ended. If the refill processing has not ended yet, the processing returns to Step S74, and the control unit 33 determines whether or not the dispensing processing has been requested in the coin handling device 2.

If the dispensing processing has been requested, the control unit 33 determines, in Step S75, whether or not the coin handling device 2 can execute the dispensing processing, based on the inventory amount.

If the answer in Step S75 is Yes, the control unit 33 causes, in Step S76, the coin handling device 2 to execute the dispensing processing.

If the inventory amount is insufficient, the answer in Step S75 is No. Step S75 is repeated. Since the refill processing by the extension unit 4 is being executed, the money handling system 10 waits for the inventory amount in the coin handling device 2 to increase. If the answer in Step S75 is Yes, the control unit 33 causes, in Step S76, the coin handling device 2 to execute the dispensing processing.

Note that if the start of the dispensing processing is delayed due to repetition of Step S75, the display unit 31 of the terminal 3 may display a notification indicating that the number of banknotes has reached a dispensable number, or may display a notification indicating an estimated time until the number of banknotes reaches the dispensable number. The display unit 31 may display an operation button for forcible start of the dispensing processing before the number of banknotes reaches the dispensable number.

In Step S77 after Step S76, if the answer in Step S77 is Yes due to the end of the refill processing, the processing returns to Step S71, and the control unit 33 determines whether or not the scheduled refill time has come.

As described above, the money handling system 10 executes multiple types of processing in parallel if possible, which is advantageous in reducing processing time. Note that the coin handling device 2 can perform the collection processing while the extension unit 4 is performing the refill processing.

Figure 9:
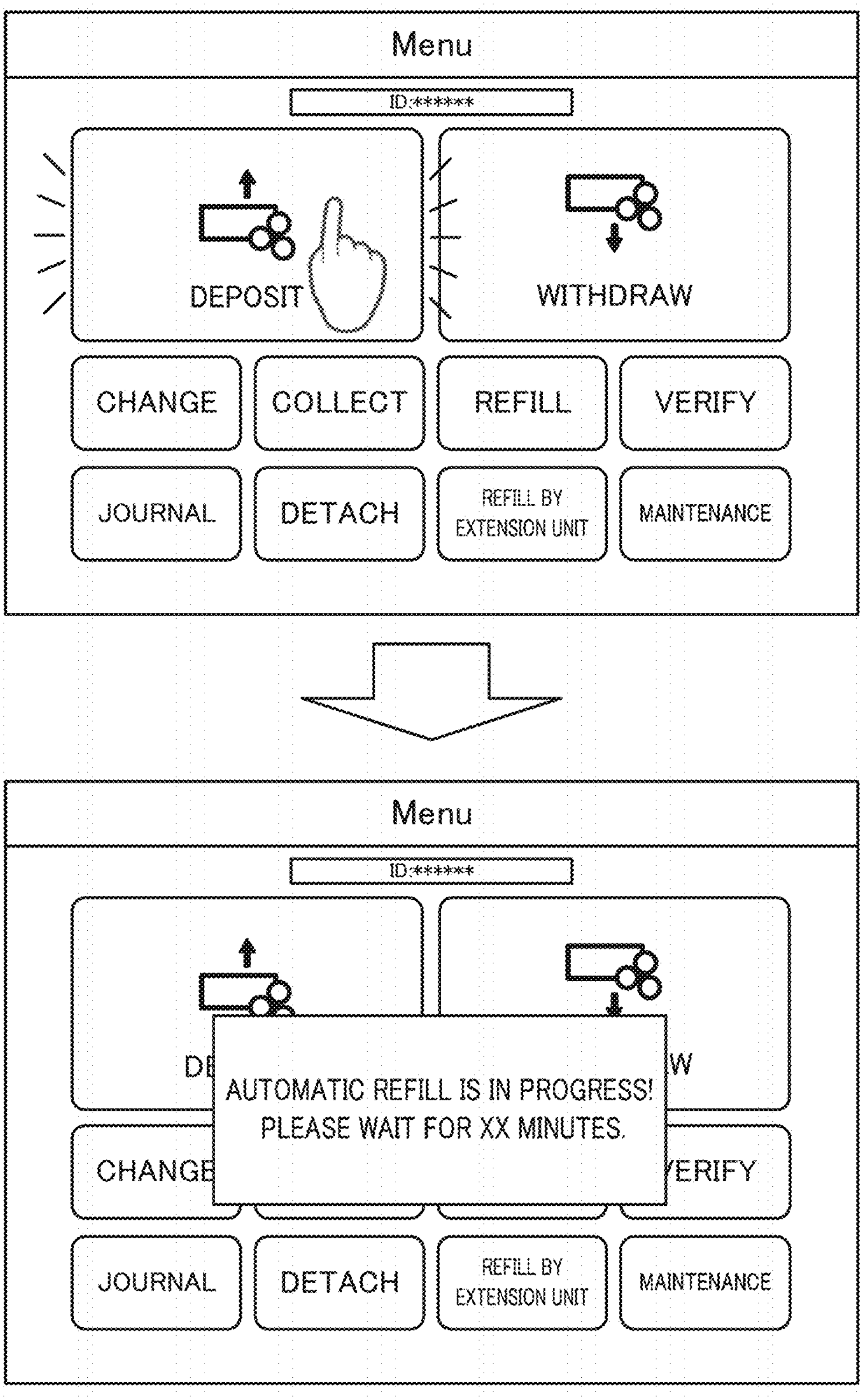
FIG. 9 illustrates transition of a screen when operation is performed during execution of refill processing.

Note that instead of making only the dispensing processing selectable on the menu screen during execution of the refill processing as illustrated in FIG. 8 as an example, a normal menu screen may be displayed even during execution of the refill processing as illustrated in the upper view of FIG. 9 as an example. In this case, when a button other than that for the dispensing processing has been selected on the menu screen (for example, a button for the depositing processing has been selected), the user may be notified that the automatic refill is being executed as illustrated in the lower view of FIG. 9 as an example. In this case, execution of the processing desired by the user is suspended. The money handling system 10 may estimate the end time of the processing executed by the coin handling device 2, and notify the user of a waiting time.

Note that in each flow of FIGS. 3, 5, and 7, the order of steps may be changed within a possible range, some steps may be omitted, or a new step may be added.

The control steps shown in the flows of FIGS. 3, 5, and 7 can be combined with each other within a possible range.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

What is claimed is:

1. A money handling method comprising:

dispensing, by a money handling device, money stored in a storage of the money handling device in response to a request by a user;

refilling, by a second device, the storage with money in response to arrival of a scheduled refill time;

suspending the refill by the second device if it is determined that the money handling device is being used by the user at a start time of the refill by the second device; and performing, by the second device, the suspended refill after an end of use of the money handling device by the user, wherein the refilling includes:

by the second device:

feeding money from a container of the second device to a transport unit of the second device, the container being one of a plurality of containers storing the money of a designated denomination; and transporting, by the transport unit of the second device, the money fed from the container of the second device to a discharge outlet of the second device, the discharge outlet of the second device being connected to an inlet of the money handling device; and by the money handling device:

recognizing the money fed from the inlet;

transporting the recognized money in the storage; and storing the money in storage containers of the storage according to the denomination, the second device and the money handling device are controlled by different controllers, and the second device is directly connected to the money handling device.

2. The money handling method of claim 1, wherein during the suspension of the refill, the money handling device notifies the user of the suspension of the refill.

3. The money handling method of claim 2, wherein if the money handling device has received an interruption request for interrupting the use by the user, through user operation during the suspension of the refill, the second device performs the suspended refill, and the interrupted use of the money handling device is resumed after completion of the refill.

4. The money handling method of claim 1, wherein execution and non-execution of the suspended refill are switched after the end of the use of the money handling device according to processing executed by the money handling device during the suspension of the refill.

5. The money handling method of claim 4, wherein the second device executes the refill if a suspension time is within a predetermined time, and does not execute the refill if the suspension time exceeds the predetermined time.

6. The money handling method of claim 4, wherein the second device executes the refill if the money handling device executes dispensing processing or collection processing during the suspension of the refill, and does not execute the refill if the money handling device executes depositing processing during the suspension of the refill.

7. The money handling method of claim 6, wherein in a case where the money handling device has executed depositing processing during the suspension of the refill, the second device executes the refill if an inventory amount in the storage after the depositing processing is less than a predetermined amount, and does not execute the refill if the inventory amount in the storage is the predetermined amount or more.

8. The money handling method of claim 4, wherein if the refill is not executed, the money handling device notifies the user of the non-execution of the refill.

9. The money handling method of claim 4, wherein if the refill is not executed, the money handling device notifies the user for prompting to perform the refill based on the inventory amount of the storage.

10. The money handling method of claim 1, wherein execution and non-execution of the suspended refill are switched according to an inventory amount in the storage after the end of the use of the money handling device.

11. The money handling method of claim 10, wherein the second device executes the refill if the inventory amount in the storage after the end of the use of the money handling device is less than a predetermined amount, and does not execute the refill if the inventory amount in the storage is the predetermined amount or more.

12. The money handling method of claim 10, wherein the second device executes the refill if the inventory amount inventory amount in the storage after the end of the use of the money handling device is an inventory amount before the use or less, and does not execute the refill if the inventory amount in the storage after the end of the use exceeds the inventory amount before the use.

13. A money handling system comprising:

a money handling device that dispenses money stored in a storage of the money handling device in response to a request by a user; and a second device that is directly connected to the money handling device and refills the storage with money in response to arrival of a scheduled refill time, wherein if it is determined that the money handling device is used by the user at a start time of the refill, the second device suspends the refill, and performs the suspended refill after an end of use of the money handling device by the user the second device is configured to:

feed money from a container of the second device to a transport unit of the second device, the container being one of a plurality of containers that store the money of a designated denomination; and transport, by the transport unit of the second device, the money fed from the container of the second device to a discharge outlet of the second device, the discharge outlet of the second device being connected to an inlet of the money handling device, the money handling device is configured to:
recognize the money fed from the inlet;
transport the recognized money in the storage; and
store the money in storage containers of the storage according to the denomination, and
the second device and the money handling device are controlled by different controllers.

* * * * *